United States Patent [19]

Lachowicz et al.

[11] 3,879,358
[45] Apr. 22, 1975

[54] NITRATED POLYMERS WITH SATURATED HYDROCARBON BACKBONE

[75] Inventors: Donald R. Lachowicz, Fishkill; Charles B. Holder, Wappingers Falls, both of N.Y.

[73] Assignee: Texaco Inc., New York, N.Y.

[22] Filed: Jan. 22, 1973

[21] Appl. No.: 325,470

Related U.S. Application Data

[63] Continuation of Ser. No. 148,133, May 28, 1971.

[52] U.S. Cl. ........ 260/80.78; 260/94.7 N; 260/877; 260/878; 260/879
[51] Int. Cl. ...................... C08f 15/40; C08f 17/00
[58] Field of Search ............ 260/877, 94.7 N, 80.78

[56] References Cited
UNITED STATES PATENTS 3,583,961   6/1971   Magay ........................ 260/94.7 N
3,751,522   8/1973   Lachowicz et al. ................ 260/877
3,751,523   8/1973   Lachowicz et al. ................ 260/877

FOREIGN PATENTS OR APPLICATIONS
221,814   6/1962   Austria .............................. 260/877

*Primary Examiner*—Murray Tillman
*Assistant Examiner*—Richard B. Turer
*Attorney, Agent, or Firm*—Thomas H. Whaley; Carl G. Ries

[57] ABSTRACT

Graft copolymers are prepared in a two-stage process by first reacting, for example, 1,2-polybutadiene or an ethylene/propylene/alkylidene norbornene terpolymer with dinitrogen tetroxide to form a nitrated backbone polymer having incorporated therein nitro and nitrite functions which serve, in the second stage of the process, as sites for the subsequent graft copolymerization of an acrylate monomer.

6 Claims, No Drawings

NITRATED POLYMERS WITH SATURATED HYDROCARBON BACKBONE

This is a division, of application Ser. No. 148,133, filed May 28, 1971.

BACKGROUND OF THE INVENTION

1. Field of the Invention

This invention relates to graft copolymers and, in particular, to the grafting of an acrylate onto a backbone chain of a dissimilar polymer.

2. Description of the Prior Art

The preparation of a wide variety of graft copolymers has been described in the art. For example, graft copolymers can be prepared as described in U.S. Pat. No. 3,507,932 by oxidizing a methacrylic homopolymer, such as isopropyl methacrylate, with air to form a hydroperoxide derivative and then reacting the said derivative with a high molecular weight methacrylate ester thus forming a graft copolymer. Prior to this invention, however, no process existed for preparing a graft copolymer of an acrylate with a backbone polymer, such as a 1,2-polybutadiene, in which a nitrated intermediate product formed by reacting the 1,2-polybutadiene with dinitrogen tetroxide is further reacted and polymerized with a acrylate monomer.

One object of this invention is to provide a process for preparing graft copolymers by copolymerizing an unsaturated hydrocarbon polymer previously treated with dinitrogen tetroxide to form reactive sites therein, with an acrylate monomer.

Another object of this invention is to graft an acrylate monomer to a dissimilar backbone polymer while avoiding crosslinking.

BRIEF SUMMARY OF THE INVENTION

In the process of this invention graft copolymers are prepared by:

A. contacting a backbone polymer having a saturated hydrocarbon chain portion and a plurality of pendant hydrocarbon groups each containing a moiety of the formula:

wherein $R^a$ and $R^b$ are independently selected from the group consisting of hydrogen and alkyl of from 1 to 16 inclusive carbon atoms with dinitrogen tetroxide to form a nitrated intermediate backbone polymer product having incorporated therein nitro and nitrite (i.e., —ONO) groups, and B. reacting said nitrated intermediate backbone polymer product with an acrylate of the formula:

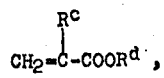

wherein $R^c$ is hydrogen or alkyl of from 1 to 3 inclusive carbon atoms and $R^d$ is alkyl of from 1 to 30 inclusive carbon atoms, to form a graft copolymer.

The thermoplastic copolymers of this invention, which can be extruded or molded, can be utilized to prepare sheet, rod, parts for appliances, etc. A wide variety of glass and asbestos fiber reinforced plastic compositions which exhibit excellent mechanical properties can be prepared using the copolymers of this invention.

DETAILED DESCRIPTION OF THE INVENTION

First Stage

In the first stage reaction, the backbone polymer is contacted with dinitrogen tetroxide (sometimes after prepurging the reaction system with an inert gas, such as nitrogen, to remove oxygen) to form a nitrated intermediate polymeric product containing both nitro and nitrite functions. The exact structure of the nitrated intermediate polymeric product formed in the first stage is not known; however, in the resulting product the nitro and nitrite groups form on either olefinic carbon when both of the latter have the same number of hydrogen atoms attached, and when the olefin group is terminal, the nitro group attaches itself to the terminal olefinic carbon. Further, it is known that in a substantial number of the recurring units of the backbone polymer a nitro group adds on to each of the olefinic carbon atoms.

The intermediate polymeric compound, i.e., the nitrated backbone polymer formed in the first stage of the process of this invention when dinitrogen tetroxide is reacted with, for example, a 1,2-polybutadiene is believed to contain recurring units of the formula:

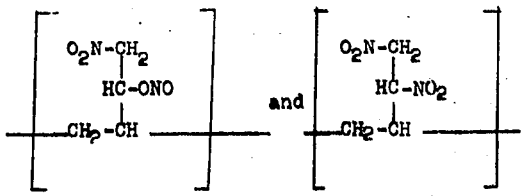

while backbone polymers having, for example, recurring 5-methylene-2-norbornene units, yield intermediate polymeric products believed to contain units of the formula:

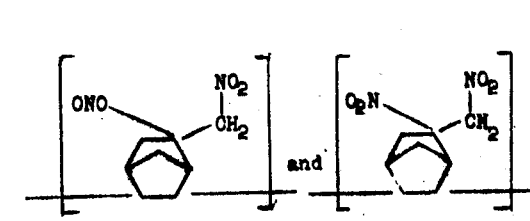

The formed nitrated backbone polymer product can be recovered from the reaction mixture at the conclusion of the first stage reaction, if desired, by stripping off the solvent.

The reaction temperature employed is advantageously between −30° and 20°C. Higher reaction temperatures tend to facilitate the decomposition of the nitrated product and at temperature below the prescribed range the dinitrogen tetroxide will not function due to its inability to dissociate into monomeric nitrogen dioxide.

The amount of dinitrogen tetroxide utilized in the first stage which can be varied over a wide range generally will be from about 0.00001 to 0.01 mole per gram of the backbone polymer charged to the reactor: the actual amount employed depends on the C=C equivalents/gram of backbone polymer desired to be reacted. The dinitrogen tetroxide may be introduced into the reactor in liquid form although preferably it is added as a gas and usually in admixture with an inert gas such as nitrogen, argon, etc. The reaction time is normally between about ½ and 10 hours although longer or shorter periods may be employed.

It is to be noted that the nitrating agent, dinitrogen tetroxide, is actually an equilibrium mixture of dinitrogen tetroxide and nitrogen dioxide with the equlibrium being driven to essentially 100% nitrogen dioxide at 140°C. Under advantageous conditions, the nitrating agent is normally introduced into the reaction system at a rate of between about 0.002 and 0.2 gram/min/-gram of backbone polymer; however, the actual rate depends in large measure upon the rate of heat removal from the reaction system. To promote contact of the reactants in the first stage, the reaction is desirably carried out under conditions of agitation in the presence of an inert liquid diluent, for example, inert liquids having a boiling point between about 30° and 100°C, such as n-hexane, n-heptane, carbon tetrachloride and diethylether.

Backbone polymers having recurring units of the formula:

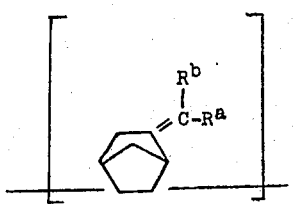

wherein $R^a$ and $R^b$ have the same meaning as previously defined are referred to herein as norbornene polymers.

Norbornene polymers useful as backbone polymers in this invention include homopolymers prepared, for example from the 5-alkylidene-2-norbornenes such as 5-methylidene-2-norbornene (also called 5-methylene-2-norbornene), 5-ethylidene-2-norbornene, 5-isobutylidene-2-norbornene, 5-n-heptylidene-2-norbornene, 5-n-heptadecylidene-2-norbornene, 5-n-tridecylidene-2-norbornene, etc. Mixtures of the homopolymers may be employed, if desired. Such homopolymers can be prepared by contacting a solution of the 5-alkylidene-2-norbornene in benzene with a solution of a catalyst comprising titanium tetrachloride and lithium aluminum tetraheptyl in which the mole ratio of the titanium tetrachloride to the lithium aluminum tetraheptyl is more than one as more completely described by Sorensen and Campbell, *Preparative Methods of Polymer Chemistry*, Interscience Publishers, New York, 1968, p.427.

The 5-alkylidene-2-norbornene monomers can be prepared by isomerizing the corresponding 2-alkylnorbornadiene in the presence of a catalyst, such as p-toluene sulfonic acid or aluminum chloride, as described in Nyce U.S. Pat. No. 3,151,173.

Terpolymers of these same 5-alkylidene-2-norbornenes are highly useful as backbone polymers in the process of this invention. These polymeric materials are copolymers of ethylene, at least one alpha-olefin having the structure:

R—CH=CH$_2$ where R is a $C_1$–$C_8$ alkyl radical and a 5-alkylidene-2-norbornene, the said terpolymer having an iodine number between 2 and 60 and containing by weight about 20 to 76.4 percent R—CH=CH$_2$ monomer units, and about 3.6 to 20 percent 5-alkylidene-2-norbornene monomer units.

Representative examples of such terpolymers include: ethylene/propylene/5-methylidene-2-norbornene; ethylene/propylene/5-ethylidene-2-norbornene; ethylene/propylene/5-isobutylidene-2-norbornene; ethylene/propylene/5-n-heptylidene-2-norbornene; ethylene/1-butene/5-heptylidene-2-norbornene; thylene/1-butene/5-ethylidene-2-norbornene; ethylene/1-butene/5-n-decylidene-2-norbornene; ethylene/4,4-dimethyl-1-hexene/5-ethylidene-2-norbornene; ethylene/5,5-dimethyl-1-octene/5-isopropylidene-2-norbornene; ethylene/6-methyl-1-heptene/5-n-tridecylidene-2-norbornene; ethylene/propylene/1-decene/5-ethylidene-2-norbornene and ethylene/5,6,6-trimethyl-1-heptane/5-ethylidene-2-norbornene. Mixtures of the terpolymers may be used, if desired.

Preparation of the above-described terpolymers can be accomplished as set forth in U.S. Pat. No. 3,151,173 by contacting ethylene, at least one alpha-olefin, and at least one 5-alkylidene-2-norbornene in solution in inert solvents with coordination catalysts, at temperatures between −20° and 70°C at atmospheric, subatmospheric, or superatmospheric pressure and in the absence of catalyst poisons such as oxygen, water, and carbon dioxide.

A second group of backbone polymers which are highly useful as starting materials in the process of this invention include polymers having recurring units of the formula:

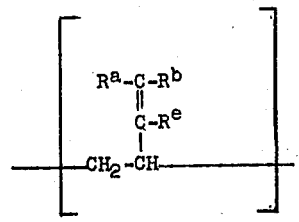

wherein $R^a$, $R^b$ and $R^c$ are independently selected from the group consisting of hydrogen, and alkyl of from 1 to 16 carbon atoms. Examples of useful backbone polymers of this type include polymers having recurring units as shown below:

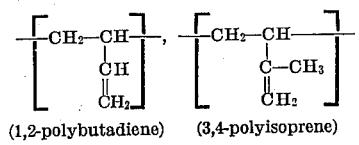

(1,2-polybutadiene)   (3,4-polyisoprene)

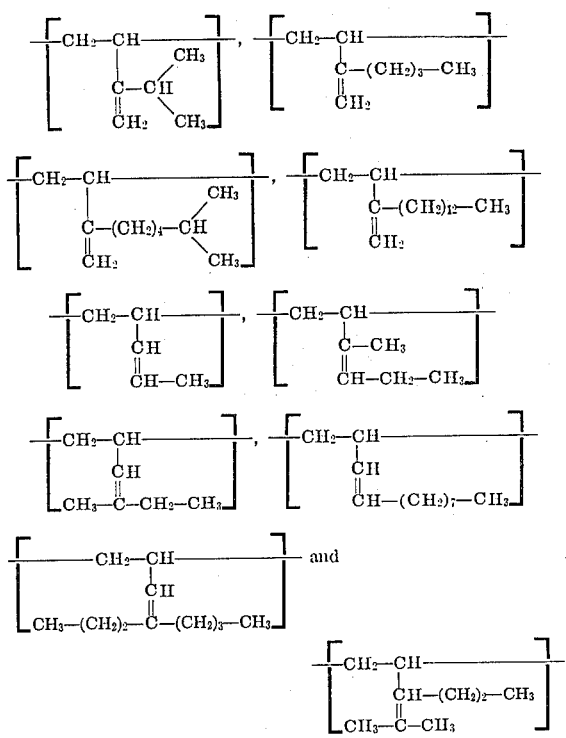

The 1, 2-polydienes, such as the 1,2-polybutadienes, can be formed in a variety of ways well known in the art. For example, 1,3-butadiene can be polymerized in tetrahydrofuran in the presence of butyl lithium at a temperature of about 5° to about 70° C to give 1,2-polybutadiene of molecular weight of from about 5000 to about 10,000 or more. 3,4-Polyisoprene can be prepared by homopolymerization of isoprene in the presence of aluminum triethyl and tetra-n-propyl titanate for about 8 hours at a temperature of 24°C, as more completely described by Sorensen at al, ibid, p. 321-2.

Second Stage

In the second stage, the grafting of acrylate monomer takes place at the site of nitrite (—ONO) attachment through the mechanism of a free radical polymerization. The nitrated intermediate polymer product formed in the first stage thus provides not only the sites for the graft polymerization but also the free radicals necessary to initiate the polymerization of the acrylate monomer.

After the first stage reaction has been completed and the unsaturated polymer having nitro and nitrite groups incorporated therein has been formed, and if the system previously had not been placed under an inert atmosphere an inert purge gas such as nitrogen, preferably, is passed through the reaction mixture and continued until any oxygen has been removed. The acrylate monomer, which may be dissolved in an inert solvent such as ether, n-hexane or benzene, etc. if desired, is then added to the polymer solution after the monomer or its solution has been purged with an inert gas.

Useful acrylate monomers have the formula:

wherein $R^c$ is hydrogen of alkyl of from 1 to 3 inclusive carbon atoms as exemplified by methyl, ethyl, propyl and isomers thereof, and $R^d$ is alkyl of from 1 to 30 inclusive carbon atoms as exemplified by methyl, ethyl, propyl, butyl, pentyl, hexyl, oxtyl, nonyl, decyl, undecyl, hexadecyl, heptadecyl, octadecyl, nonadecyl, eicosyl, docosyl, pentacosyl, and isomers thereof. Mixtures of these acrylates may be employed, if desired.

In the second stage, in which graft copolymerization takes place, the reaction mixture is heated to decompose the nitrite sites in the backbone polymer. Generally the reaction mixture is heated to a temperature of from about 35° to about 175° C and, preferably, at a temperature of about 80° to about 130°C. The second stage reaction may be conducted under refluxing conditions. Heating is continued until the desired degree of graft polymerization has been accomplished. The course of the reaction can be followed by measurement, for example, of the refractive index of the mixture or by determining some other easily measurable physical property.

The extent of the grafting achieved is directly dependent on the extent of the nitrite formation. One skilled in the art can prepare the desired graft copolymer by carefully selecting the necessary reaction conditions, such as time, temperature, etc. in the first and second stages of the process of this invention.

Recovery of the product from the reaction mixture can be accomplished by a variety of methods well known in the art such as by the addition of methanol or acetone to precipitate the product which can be recovered by decantation, centrifugation, filtration, etc. and the crude polymer can be redissolved in a suitable solvent such as chloroform, benzene or toluene, etc, and reprecipitated in purified form by addition of methanol or acetone to the polymer solution. Fractional precipitation may be utilized to identify the final polymer as a true graft polymer of the backbone polymer and the acrylate.

A relatively small amount of dinitrogen tetroxide should be used in the first stage when backbone polymers of the ethylene/propylene/5-ethylidene-2-norbornene type is employed (i.e. about 0.00001 to about 0.001 mole of dinitrogen tetroxide/g of polymer or less.

The backbone polymers utilized in forming the novel graft copolymers of this invention generally will have molecular weights of from about 5000 to about 200,000 or more and, preferably, from about 10,000 to about 150,000. The final graft copolymer products will have molecular weights of from about 6500 to about 1,000,000 or more and, preferably, from about 15,000 to about 250,000.

Generally, the backbone polymer will make up about 5 to about 80 and, preferably, from about 10 to about 40 percent by weight of the final graft copolymer with the balance being furnished by the monomer which is grafted and polymerized onto the nitrated backbone polymer. The following examples illustrate various embodiments of this invention and are to be considered not limitative.

EXAMPLE I

Graft Copolymer of Methyl Methacrylate and 1,2-Polybutadiene

Into a resin kettle equipped with a reflux condenser, a thermometer, a mechanical stirrer, and a gas inlet tube were placed 5.0 g of 1,2-polybutadiene (molecular weight 10,000) and diethyl ether (300 ml). The mixture was stirred at room temperature until the polymer dissolved and the solution was cooled to ice bath temperature while purging it with nitrogen (½ hr). The gas inlet tube was connected to a graduated container of liquid dinitrogen tetroxide; a stream of nitrogen was passed over the dinitrogen tetroxide and the resultant gaseous mixture ($N_2O_4/N_2$) was conducted into the reaction solution (at ice bath temperature) through the gas inlet tube. 0.4 ml of liquid dinitrogen tetroxide was transferred to the reaction solution in this manner over a period of 55 min. Methyl methacrylate (25 ml) was added to the reaction solution and the resultant solution was heated at 50°–55° C for a period of 5 hr. Most of the ether was distilled from the reaction mixture within the first hour of this time period. After stirring overnight at room temperature the resultant solution was stirred into methanol (400 ml), yielding the graft copolymer product as a precipitate. The recovered product, which was dried in vacuo, weight 7.2 g.

Addition of a benzene solution of the graft copolymer to isopropyl alcohol resulted in a hazy solution but most of the product remained soluble. In contrast, methyl methacrylate homopolymer immediately precipitated when its solution in benzene was similarly added to isopropyl alcohol. This test indicated that a true graft copolymer had been formed.

EXAMPLE II

Graft Copolymer of Butyl Methacrylate on Nitrated Ethylene/Propylene/5-Ethylidene-2-Norbornene Terpolymer Into a resin kettle equipped with a reflux condenser, a thermometer, a mechanical stirrer, and a gas inlet tube were placed 5.0 g of an ethylene/propropylene/5-ethylidene-2-norbornene terpolymer marketed by Copolymer Rubber and Chemical Corporation under EPsyn trademark Epsyn 40–A (molecular weight 76,000, raw Mooney viscosity(ML-8' at 250°F) 40, specific gravity 0.86, gel content - none) and n-heptane (160 ml). The mixture was stirred at room temperature until the polymer dissolved following which the solution was cooled to the temperature of an ice bath. The gas inlet tube was connected to a graduated container of liquid dinitrogen tetroxide; a stream of nitrogen (at a rate of 60.8 ml/min (STP)) was passed over the dinitrogen tetroxide and the resultant gaseous mixture ($N_2O_4/N_2$) was conducted into the reaction solution (at ice bath temperature) through the gas inlet tube. One-tenth milliliter of liquid dinitrogen tetroxide was transferred to the reaction solution in this manner over a period of 47 min. Unreacted dinitrogen tetroxide was purged from the reaction solution with a stream of nitrogen. Butyl methacrylate (50 ml) was added to the reaction solution and approximately 90 ml of solvent was stripped off under vacuum to concentrate the reactants. The reaction solution was subsequently heated at about 60 and 80°C for 2 and 4 hr, respectively. After dilution with benzene (100 ml) to lower the viscosity and after methanol (400 ml) was added, the graft copolymer product precipitated from the solution. To the resulting mixture there was added 1500 ml of additional methanol with mixing following which the graft copolymer was separated by decantation. The product was dissolved in 200 ml of benzene and re-precipitated by addition of 1000 ml of methanol (to remove unreacted monomer) and afterwards dried in vacuo. The weight of the dry polymer was 18.1 g.

A sample of a graft copolymer product prepared with EPsyn 40–A and butyl methacrylate in the same manner as in Example II (0.810 g), calculated to contain 0.25 g of EPsyn 40–A, was dissolved in benzene (30 ml). Acetone (90 ml) was slowly added to this solution resulting in precipitation of an acetone-insoluble fraction amounting to 0.103 g. A similar procedure with 0.250 g of EPsyn 40-A resulted in precipitation of 0.228 g. In addition, an infrared spectrum of the acetone-insoluble fraction of the product indicated that it contained an appreciable amount of polybutyl methacrylate which as a homopolymer is acetone-soluble. These tests indicate that a true graft copolymer had been prepared.

EXAMPLE III

Nitrated 1,2-polybutadiene

Into a resin kettle equipped with a reflux condenser, a thermometer, mechanical stirrer, and a gas inlet tube are placed 5.0 g of 1,2-polybutadiene (molecular weight about 4800) and carbon tetrachloride (300 ml). The polymer is dissolved by stirring the mixture at room temperature after which the solution is purged with nitrogen (¾ hr). In the next step the gas inlet tube is connected to a graduated container of liquid dinitrogen tetroxide. Nitrogen is passed over the liquid dinitrogen tetroxide and the resultant gaseous mixture ($N_2O_4/N_2$) conducted into the reaction solution (at 28° C) through the gas inlet tube. In this manner, 0.4 ml of the liquid dinitrogen tetroxide is added to the reaction solution over a period of about 60 min. The nitrated polymer thus formed is recovered from the reaction mixture as a solid product after removal of the solvent by distillation. (Yield: about 5.3 g).

EXAMPLE IV

Nitrated Ethylene/4,4-Dimethyl-1-Hexene/5-Methylidene-2-Norbornene Terpolymer

A total of 5.0 g of an ethylene/4,4-dimethyl-1-hexene/5-methylidene-2-norbornene terpolymer having a molecular weight of 55,000 is added to a resin kettle equipped with reflux condenser, a thermometer, a mechanical stirrer and a gas inlet tube and n-hexane (150 ml). The mixture is stirred at about room temperature until the terpolymer dissolves following which the solution is cooled to ice bath temperature. The gas inlet tube is connected to a graduated container of liquid dinitrogen tetroxide. Nitrogen gas at the rate of about 40 ml/min (STP) is passed over the dinitrogen tetroxide and the gaseous mixture resulting ($N_2O_4/N_2$) is conducted into the reaction solution at ice bath temperature through the gas inlet tube. In this manner, about 0.2 ml of liquid dinitrogen tetroxide is added to the reaction solution over a period of about 35 min. Unreacted dinitrogen tetroxide is purged from the reaction solution utilizing a stream of nitrogen after which the solvent is stripped from the reaction mixture yielding the solid nitrated terpolymer. (Yield: approximately 5.1 g).

EXAMPLES V–XI

A number of additional graft polymerization runs were conducted in the same manner as described in Examples I and II above. Pertinent details relating to these examples are presented in Table 1.

TABLE 1

Graft Copolymerization with Nitrated Ethylene/
Propylene/5-Ethylidene-2-Norbornene Terpolymer[a]

| Example No | Methacrylate Ester (ml) | Solvent (ml) | Temp(°C)/ Time (hr) | Polymer Wt Increase(%) |
|---|---|---|---|---|
| V[b] | Methyl (100) | Hexane (70) | 60/4.5 | 744 |
| VI[b] | Methyl (100) | Hexane (70) | Room Temp/30.5 | 1172 |
| VII[b] | Butyl (100) | Hexane (100) | 75/5 | 312 |
| VIII[b] | Lauryl (100) | Hexane (100) | 80/7 | 400 |
| IX[b] | Methyl (100) | Hexane (70) | 60/4.5 | 620 |
| X[b] | Methyl (100) | Hexane (60) | 60/3.1 | 160 |
| XI[c] | Butyl (150) | Hexane (160) | 60/2; 80/4 | 262 |

[a] - In preparing the nitrated terpolymer 0.1 ml (liquid) dinitrogen tetroxide was slowly transferred as a gas mixed with nitrogen into a solution of 5.0 g of the backbone polymer.

[b] - Backbone terpolymer, an ethylene/propylene/5-ethyl-idene-2-norbornene terpolymer marketed by Copolymer Rubber and Chemical Corporation under the trademark EPsyn 55, molecular weight about 90,600, raw Mooney viscosity (ML-8' at 250°F) 55, specific gravity 0.86, gel content - none).

[c] - Backbone terpolymer - EPsyn 40-A. (See Example II for description.)

EXAMPLES XII-XIV

In this series the grafting of butyl methacrylate, lauryl methacrylate and a mixture of lauryl methacrylate, and butyl methacrylate respectively, to an ethylene/propylene/5-ethylidene-2-norbornene terpolymer having a molecular weight of about 76.000 (EPsyn 40-A) was deomonstrated. The nitration step (first stage reaction) was conducted by stirring a solution of the polymer (9.4 weight percent in heptane) with dinitrogen tetroxide (about $4.0 \times 10^{-4}$ mole per gram of polymer) for three hours at 0-5° C under a nitrogen atmosphere. The acrylate monomer, which had been purged with nitrogen, was added to the reaction solution; the resultant mixture was heated to bring about the second stage polymerization and graft reaction. Recovery of the graft copolymer was accomplished by adding methanol to the reaction mixture to precipitate the graft copolymer which was purified by dissolution in benzene and re-precipitation with methanol. Other pertinent details relating to these three examples are found in Table 2.

TABLE 2

METHACRYLATE GRAFT COPOLYMERS

| Run No. | Monomer[1] | Graft Conditions Temp(°C) | Time (hr) | Conversion (%) | Polymer Weight Increase(%) |
|---|---|---|---|---|---|
| XII | BMA | 100 | 7 | 12.2 | 110 |
| XIII | LMA | 100 | 7 | 7.5 | 66 |
| XIV | LMA-BMA[2] | 80 | 5 | 7.1 | 63 |

[1] - BMA and LMA stand for butyl and lauryl methacrylates, respectively.

[2] - LMA-BMA molar ratio of 1.47:1.

The mechanical properties of the graft copolymer prepared in Example X was investigated. The copolymer was molded in a hydraulic press (400°F, 12,500 psi) into thin, clear film (thickness - about 2.5 mils) which was extremely flexible by comparison with poly(methyl methacrylate) and could be creased without cracking. Pertinent data relating to these tests are included in Table 3.

The Izod impact strength reported for film prepared with the polymer of Example X is 12 times greater than that obtained for poly(methyl methacrylate) and is in the range exhibited for many commercial acrylonitrile-butadiene-styrene (ABS) resins.

TABLE 3

MECHANICAL PROPERTIES OF SOLID GRAFT COPOLYMERS

| Copolymer of Example | Poly-MMA[1]/Epsyn 55 Weight Ratio | Izod Impact, ft lb per in Notch | Elastic Modulus, psi | Tensile Strength at Break, psi | Elongation % |
|---|---|---|---|---|---|
| X | 1.6:1 | 3.6 | 76,000 | 2130 | 18 |
|  | Poly-MMA[1] | 0.3 | 425,000 | 9750 | 9.5 |

[1] Poly-MMA is poly(methyl methacrylate).

The graft copolymers of this invention may be utilized to prepare rod, sheet and parts such as horn buttons, instrument panels and medallions, safety guards, brush backs, costume jewelry, decorative parts, parts for home appliances, toys, reinforced plastics, etc. with high tensile and impact strengths, by extrusion or molding at pressures ranging from about 500 to 15,000 psi or more at temperatures of from about 100° to about 250°C. Lubricants, plasticizers, modifiers, fillers, coloring matter may be added to the copolymer compositions as required as will be appreciated by those skilled in the art. In general, the graft copolymers of this invention can be employed wherever impact-resistant resins (e.g. ABS resins, high-impact polystyrene) are now used. When used in place of resin containing SBR or nitrile rubbers, they yield products with improved aging and ozone resistance.

A smooth reinforced plastic sheeting composition possessing excellent mechanical properties can be prepared by mixing about 100 parts by weight of the graft copolymer of Example II and about 50 parts by weight of a polyvinyl butyral resin having a polyvinyl alcohol content not in excess of 22 percent, in a Banbury mixer for about 15 minutes and then passing the mixture through a three-roll vertical calender. This same composition can be formulated as a molding compound possessing the ability to be molded by compression or injection on short cycles and at reasonable temperatures.

The graft copolymers of this invention are useful for wire cable covering. For example, clean copper wire (8 gage) can be passed through a bath containing a 20 percent by weight solution of the copolymer composition of Example X in benzene at a temperature of 35°C and afterwards passing the treated wire through a dryer maintained at 85°C to yield an insulated wire having a highly flexible copolymer coating useful in a variety of electrical applications.

What is claimed is:

1. A process for preparing a nitrated polymer which comprises:

A. contacting a backbone polymer having a saturated hydrocarbon chain portion and plurality of pendant hydrocarbon groups each containing a moiety of the formula:

wherein $R^a$ and $R^b$ are independently selected from the group consisting of hydrogen and alkyl of from 1 to 16 inclusive carbon atoms, with dinitrogen tetroxide at a temperature of about −30 to about 20°C thus forming a nitrated backbone polymer product having incorporated therein nitro and nitrite groups wherein the amount of dinitrogen tetroxide introduced is from about 0.00001 to about 0.1 mole/g. of the backbone polymer and B. recovering the said nitrated backbone polymer product from the reaction mixtures.

2. The process of claim 1 wherein the backbone polymer comprises recurring units of the formula:

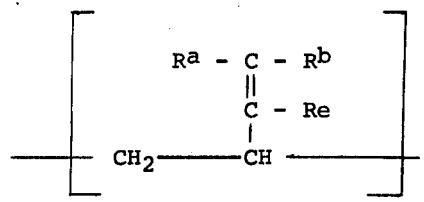

wherein $R^a$, $R^b$, and $R^c$ are independently selected from the group consisting of hydrogen and alkyl of from 1 to 16 inclusive carbon atoms.

3. The process of claim 1 wherein the said backbone polymer is 1,2-polybutadiene.

4. The process of claim 1 wherein the said backbone polymer is a terpolymer of ethylene, propylene and units of the formula:

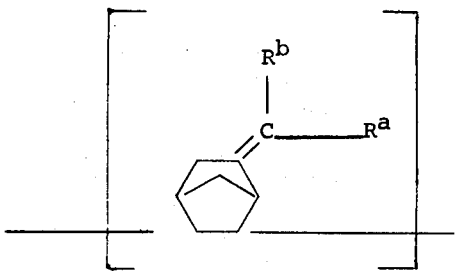

wherein $R^a$ and $R^b$ are independently selected from the group consisting of hydrogen and alkyl of from 1 to 16 carbon atoms.

5. The process of claim 1 wherein the said backbone polymer is a terpolymer of ethylene, propylene and 5-ethylidene-2-norbornene.

6. The process of claim 1 wherein the said backbone polymer comprises recurring units of the formula:

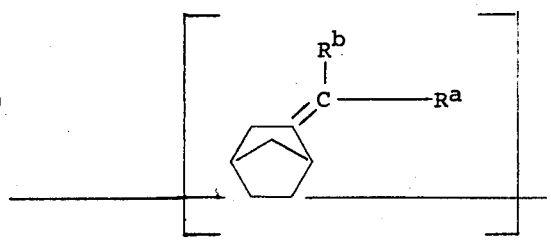

wherein $R^a$ and $R^b$ are independently selected from the group consisting of hydrogen and alkyl of from 1 to 16 inclusive carbon atoms.

* * * * *